United States Patent [19]

Ito et al.

[11] 4,027,554

[45] June 7, 1977

[54] ELECTRONIC CONTROL APPARATUS OF AN AUTOMATIC SPEED CHANGING APPARATUS

[75] Inventors: Terukazu Ito, Isehara; Kiyoharu Nakao, Hiratsuka; Teruo Minami, Yokohama; Masaru Uenoyama, Kawasaki, all of Japan

[73] Assignee: Kabushiki Kaisha Komatsu Seisakusho, Tokyo, Japan

[22] Filed: July 24, 1974

[21] Appl. No.: 491,359

[30] Foreign Application Priority Data

July 30, 1973 Japan .............................. 48-85698

[52] U.S. Cl. .............................................. 74/866
[51] Int. Cl.² ......................................... B60K 41/18
[58] Field of Search ............ 74/733, 731, 645, 866; 192/3.31

[56] References Cited

UNITED STATES PATENTS 3,448,640 6/1969 Nelson ................................. 74/866
3,805,640 4/1974 Schneider et al. .................... 74/733

Primary Examiner—Samuel Scott
Assistant Examiner—Lance W. Chandler
Attorney, Agent, or Firm—Spensley, Horn and Lubitz

[57] ABSTRACT

In an electronic control apparatus of an automatic speed changing apparatus for use in an internal combustion engine of the type wherein the engine is connected with a load through a fluid type torque converter and a multiple stage gear changer, there are provided means for locking-up the torque converter when the speed of the output shaft thereof exceeds a first predetermined speed, means for shifting-up the gear changer to a higher stage when the speed of the output shaft exceeds a second predetermined speed which is higher than the first predetermined speed, and means for shifting-down the gear changer to a lower stage when the speed of the output shaft decreases below a third predetermined speed which is lower than the first predetermined speed whereby effecting automatic speed change control while the torque converter is maintained in the locked-up condition.

8 Claims, 23 Drawing Figures

TORQUE CONVERTER OUTPUT SHAFT SPEED DETECTOR

ELECTRONIC CONTROL APPARATUS OF AN AUTOMATIC SPEED CHANGING APPARATUS

BACKGROUND OF THE INVENTION

This invention relates to an electronic control apparatus of an automatic speed changing apparatus for use in power driven vehicles utilizing a fluid type torque converter (for the sake of brevity, hereinafter merely called a torque converter) and a multiple stage gear type speed changer.

In automatic speed changing apparatus heretofore been used for power driven vehicles the speed changing point is determined by a car speed signal or in accordance with the number of revolutions of an internal combustion engine and a negative suction pressure of the engine or the degree of depressing an acceleration pedal (throttle opening). More particularly, signals representing these parameters are converted into variations in oil pressure or electric signals, and the speed changing point is determined by the relative relation between these oil pressure variations or electric signals for opening and closing a fuel value and for selectively actuating an actuator for multiple disc type clutch. Where detection signals are produced in terms of the oil pressure variations, the oil pressure acting as the detection signals are not always accurate thus causing an error of the speed changing point. For the purpose of obviating this difficulty, a system has been developed in which detection signals are produced in the form of electric signals. In this system, the degree of depression of the acceleration pedal, the slip of the torque converter, and the number of revolutions of the engine corresponding to the car speed are detected for effecting automatic speed changing, but the construction of the apparatus is complicated because there are many parameters to be detected.

SUMMARY OF THE INVENTION

It is an object of this invention to provide an improved electronic control apparatus capable of eliminating various defects of the prior art apparatus.

Another object of this invention is to provide an improved electronic control apparatus for an internal combustion engine which can perform most suitable speed change commensurate with the condition of the engine while fully utilizing the advantageous characteristic of a fluid torque converter.

Still another object of this invention is to provide an improved electronic control apparatus for an internal combustion engine of simplified construction and requiring only two parameters to be detected.

Yet another object is to provide a novel electronic control apparatus that can readily be applied to various types of engine driven vehicles operating at different conditions.

Briefly stated, according to this invention the number of revolutions of the output shaft of the torque converter, that is the number of revolutions of the input shaft of a multiple stage gear train 3, and the load condition (the throttle opening or the degree of depression of the acceleration pedal) are used as the detection elements or parameters to form a running signal commensurate with the running condition of a power driven vehicle, and the running signal is used for controlling the lock-up and release of the torque converter as well as the gear change.

The basic feature of this inventions lies in the provision of means for locking-up the torque converter when the number of revolutions of the output shaft thereof exceeds a predetermined reference number of revolutions $N_2$, means for shifting-up the speed to a one stage higher gear stage when the number of revolutions exceeds to her reference number of speed $N_3$ ($N_3 > N_2$), means for shifting down the speed to a lower gear stage when the number of revolutions of the output shaft of the torque converter is decreased to a lower reference number $N_1$ ($N_1 < N_2$) whereby effecting automatic speed change control while the torque converter is lock-up or while the output shaft of the internal combustion engine and the input shaft of a multiple stage gear speed changer are directly intercoupled. As a result, it is possible to apply an engine brake when necessary as in a case where the vehicle is running down a slope. Further, the lock-up control and shift-up, shift-down controls are made in a most suitable relation thus ensuring adequate speed change control commensurate with the vehicle speed and the engine condition.

More particularly, the electronic control apparatus of this invention comprises means for generating a running signal including an electric signal corresponding to the load condition of an internal combustion engine, and an electric signal corresponding to the speed of the output shaft of a torque converter which is connected between the engine and a multiple stage gear change, lock control signal generating means responsive to the running signal for generating a lock-up signal for locking up the torque converter and a signal for releasing the lock-up; speed change signal generating means responsive to the lock control signal for generating shift-up pulse for changing the gear changer to a higher stage and a shift-down pulse for changing the gear changer to a lower stage; speed change stage holding means responsive to the shift-up and shift-down pulses for generating a speed change command signal; speed change stage designation signal generating means responsive to the outputs from the speed change signal generating means and the speed change stage holding means for generating a first speed change stage designation signal which shifts up the gear changer to a higher stage when the speed change command signal is generated in response to the shift-up pulse and for generating a second speed change stage designation signal which shifts down the gear changer to a lower stage when the speed change command signal is generated in response to the speed change stage designation signals for generating an electric signal which actuates an oil pressure system of a predetermined speed change stage means responsive to the lock control signal for generating an electric signal for generating an oil pressure actuated lock-up device for the torque converter, whereby when the speed of the output shaft of the torque converter exceed a first predetermined speed at a predetermined throttle opening a first electric signal for locking up the torque converter is generated, the shift-up pulse is generated when the speed of the output shaft exceeds a second predetermined speed which is higher than the first predetermined speed, and the shift-down pulse and a second electric signal are generated when the speed of the output shaft falls below a third predetermined speed which is lower than the first predetermined speed.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

To have better understanding of this invention respective parts of the preferred embodiment shown in the accompanying drawings will be described in different sections.

I. The overall Construction

Figure 1:
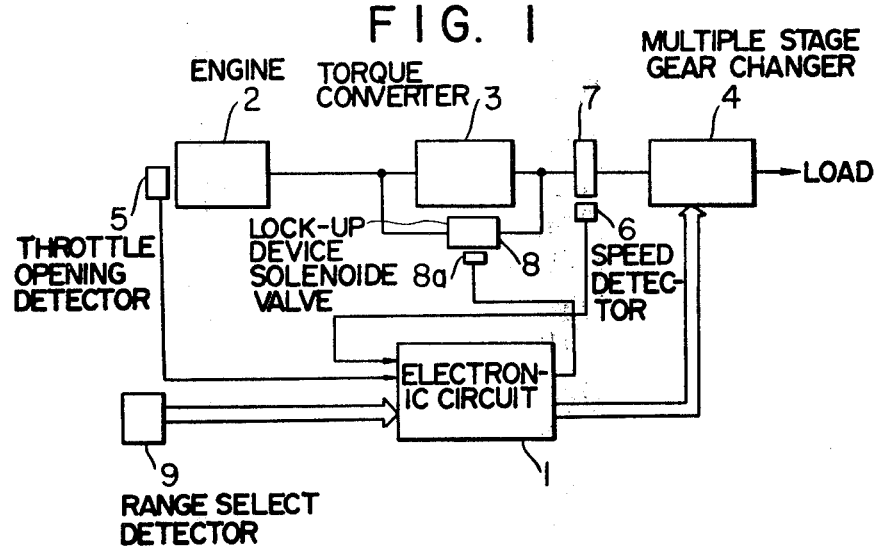
FIG. 1 in a block diagram showing the basic form of the novel electronic control apparatus embodying the invention for use in automatic speed changing apparatus of power driven vehicles.

The overall construction of the electronic control apparatus of the automatic speed changing apparatus of this invention is diagrammatically illustrated in FIG. 1. The rotation of an internal combustion engine 2 is transmitted to a multiple gear type speed changer 4 through a torque converter 3 so that the output speed is controlled in accordance of the gear ratio of the speed changer. The speed changer 4 is provided with suitable solenoid valves (not shown) which are controlled by valve drive signals generated by an electronic circuit 1; thereby providing a desired speed ratio. The electronic circuit 1 is constructed to produce the valve drive signals in response to a throttle opening signal representing the throttle opening detector 5 (or any signal representing the throttle opening such as the degree of depression of the acceleration pedal) and a torque converter output signal produced by a detector 6 for detecting the number of revolutions of the output shaft of the torque converter, and to produce desired valve drive signals for operating a solenoide valve 8a for actuating a torque converter lock-up device 8. A gear shaped disc 7 having equally spaced projections on its periphery is mounted on the output shaft of the torque converter to rotate herewith. The operating position of a gear shift lever, not shown, is detected electrically by a range select dection circuit 9, and the output thereof is applied to the electronic circuit 1.

Figure 2A:
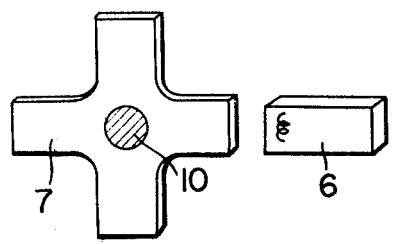
FIG. 2 shows one example of a detector of the output speed of a torque converter.
Figure 2B:
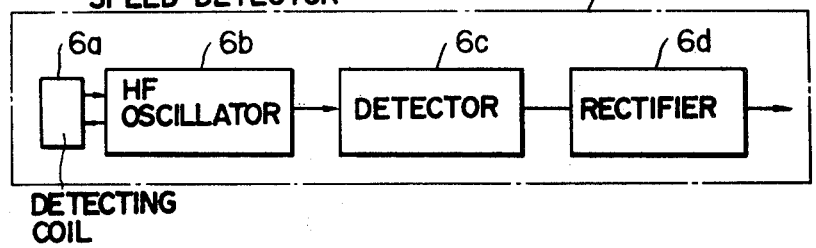
Figure 2C:
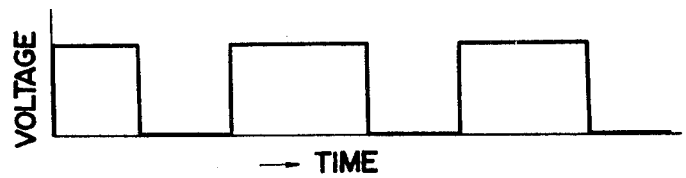
Figure 6A:
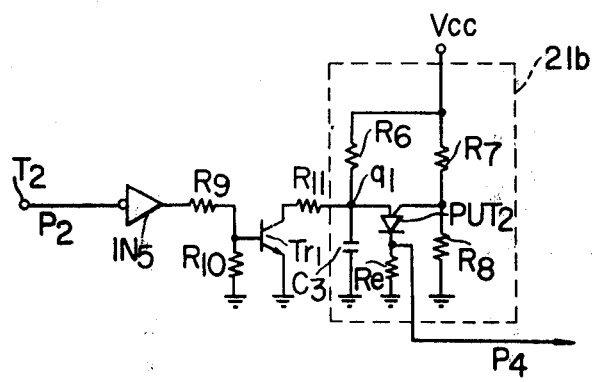
FIG. 6 is an electric circuit of one example of a detection circuit for detecting the lower limit of the number of revolutions.
Figure 6B:
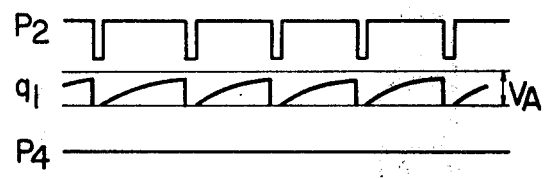

II. Detector 6 for Detecting the Number of Revolutions of the Output shaft of the torque converter The gear shaped disc 7 is provided with a plurality of equally spaced projections as shown in FIG. 2a and mounted on the output shaft 10 of the torque converter. The detector 6 is positioned close to the projections for detecting the number of revolutions of the output shaft 10. The detector 6 is a type of proximity switch which produces an electric signal when the projection approaches to it, thus producing pulse signals of the same number as passed projections. Where a high frequency oscillating circuit 6b, a detector circuit 6c and a rectifier circuit 6d are provided to cooperate with the detecting coil 6a as shown in FIG. 6b, as the projection of the disc 7 approaches to the detecting coil 6a, the oscillation of the oscillating circuit 6b stops and the oscillation is resumed as the projection departs from the detection coil. The output of the oscillation circuit 6b is detected and rectified to obtain a pulsed output wave as shown in FIG. 2c. In this manner, the detector 6 produces a pulse signal having a frequency proportional to the number of revolutions of the output shaft of the torque converter.

III. Throttle Opening Detector 5

As the output characteristic of an internal combustion engine varies in accordance with the throttle valve opening it is necessary to determine the speed changing point in accordance to the degree of throttle opening. The degree of throttle opening can be detected by electrically detecting the position of the throttle valve of the acceleration pedal by means of a proximity switch or the like, so that is is not necessary to use any special device for this purpose. The degree of opening of the throttle valve can be detected stepwisely. In this example, the opening from 0 to one half opening is designated as a first step, the opening from one half to 2/2 opening is designated as the second step and the opening beyond full opening is designated as a third step, thereby independently forming throttle opening detection signals at respective steps.

IV. Range Select Detection Circuit 9

According to this invention, a range select detector is provided for enabling switching between an automatic speed change control and a manual speed change control and for limiting the highest speed change stage during the automatic speed change, and a shift lever is provided for forcibly shifting down during the automatic speed change. The range select detection circuit 9 is provided for electrically detecting the operating position of the shift lever. Suppose a case wherein a speed change control is possible in a range of from the reverse first speed to the forward 6th speed, the detection circuit 9 produces descrete detection signals representing the reverse first step, the neutral position and the forward first speed to 6th speed in accordance with the operating position of the shift lever.

V. Speed change Range

In an internal combustion engine combined with a torque converter, in view of the output characteristic thereof, it is not advantageous to operate the engine at speeds lower than the maximum torque speed. Further it is advantageous to lock-up the torque converter when the speed of its output shaft thereof exceeds a predetermined number of revolutions. Further, as there is a limit for the maximum speed, it is necessary to shift-up from a present low speed stage to a higher speed stage. When the number of revolutions of the output shaft of the internal combustion engine decrease with the gradual increase in the load, it is also necessary to shift-down from a higher speed stage to a lower speed stage so that the speed of the output shaft of the engine will not decrease to a speed lower than the maximum torque speed.

For this reason, the speed change range is determined by the relationship between the speed of the output shaft of the torque converter and the throttle opening which substantially represents the condition of the internal combustion engine.

Figure 3:
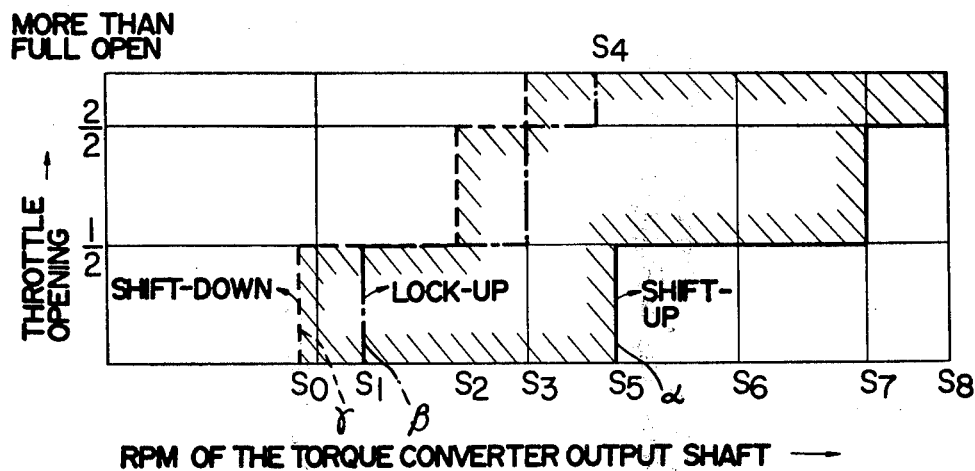
FIG. 3 is a chart showing one example of the automatic speed changing range of the novel electronic control apparatus.

Considering such a speed change range, the best speed changing point is determined as shown in FIG. 3. Adequate shift-up upper limit (solid line $\alpha$), torque converter lock-up upper limit speed (dot and dash line $\beta$), and shift-down lower limit (broken line $\gamma$) are preset corresponding to respective steps of the throttle opening. More particularly, in response to the throttle opening, detection signal and a torque converter output shaft speed detection signal are generated and whether said conditions are satisfied or not is discriminated thereby forming respective command signals for controlling the speed changing operation. This feature will be described later in connection with a preferred embodiment of the novel electronic control apparatus shown in FIG. 4.

VI. Circuit Construction

As described hereinabove the speed changing point is preset by the relationship as shown in FIG. 3. For this purpose, it is necessary to provide means for detecting a preset value of the torque converter output shaft speed, and means responsive to the output of said detecting means and a throttle opening detection signal for forming speed change point detection signals (a shift-up signal $u$, a shift-down signal D, and a lock-up signal L). The former means comprises a shift-up upper limit speed detection circuit 10a, a shift-down lower limit speed detection circuit 10b, and a lock-up upper limit speed detection circuit 10c which are respectively set with the number of revolutions corresponding to respective steps of the throttle opening. In the example shown, this means is constructed to produce a pulsed detection signal when the torque converter output shaft speed exceeds a predetermined speed in each of three steps by comparing it with the detection signal from a torque converter output shaft speed detector 6. The latter means comprises a plurality of logical product circuits $A_{21}$ to $A_{29}$ inclusive, and a plurality of logical sum circuits $OR_{11}$ to $OR_{13}$ inclusive and operates to form said speed change point detection signals in response to the outputs from respective speed detection circuits 10a, 10b and 10c, and the detection signal produced by the throttle opening detector 5.

The shift-up signal $u$ and the shift-down signal are applied to a binary shift register 14 to act as the shift control signals thereof through a speed change stage holding circuit 11. The shift-up and shift-down signals are also applied to the set and reset inputs, respectively of a mode control flip-flop circuit $FF_1$ for forming the mode control signal for the bidirectional shift register 14, the input data thereto being formed by a preset circuit 20.

The lock-up signal L is used to set a lock-up flip-flop circuit $FF_2$ to form a solenoid valve drive signal for locking-up the torque converter through a valve drive circuit 18. In response to this solenoid valve drive signal, the torque converter is locked-up. The shift-down signal D is applied to the reset input of the flip-flop circuit $FF_2$. This is because it is necessary to release the lock-up for the purpose of preventing the internal combustion engine from stalling due to overload as the speed of the engine drops.

Further there is provided means for releasing the lock-up of the torque converter to connect it to the load at the time of changing speed thereby alleviating shocks caused by speed change. This is accomplished by providing a lock-up release time circuit 15 for forming a low level signal persisting for predetermined interval in response to a shift control signal generated by a logic circuit in accordance with a speed change command pulse supplied by the speed change stage holding circuit at the time of changing speed, and by applying the low level signal to a logical product circuit $A_{30}$ for rendering the same for a predetermined interval thereby preventing the lock-up signal from being sent to the valve drive circuit 18.

The purpose of the bidirectional shift register 14 is to form a speed change stage designation signal for effecting automatic speed change in response to the shift-up signal $u$ and the shift-down signal D and the shift register 14 is provided with a number of output stages corresponding to the number of automatic speed changing stages. In the example shown, the reverse first speed R, the neutral N and the forward first speed are controlled manually, whereas from the forward second to forward sixth speeds are used as the automatic speed change stages, so that five output stages of the shift register 14 correspond to the forward second to sixth speed stages, respectively. The outputs from these stages are independently sent out to the valve drive circuit 18 so as to form predetermined valve drive signals. In this manner, according to this embodiment, since switching between manual and automatic operations is possible there are provided groups of logical circuits, such as logical product circuits $A_1$ through $A_5$, $A_{15}$ through $A_{19}$, logical sum circuits $OR_5$ through $OR_9$ and an inverter $IN_1$. The manual-automatic swiching circuit is designated by a reference numeral 22.

For the prupose of limiting the maximum speed change speed at the time of automatic speed changing, there are provided a range select circuit 12, and a forced shift-down circuit 13 for forcibly shifting-down at the time of automatic speed changing. In this example, circuits 12 and 13 are composed of the logical product circuits $A_6$ through $A_{14}$ and the logical sum circuits $OR_o$ through $OR_4$, respectively.

Furthermore, there are provided such safety devices as a neutral inhibit circuit 16 which permits the apparatus to operate only when the shift lever is positioned at the neutral position when a source switch is closed and a R-F inhibit circuit 17 which permits the reverse operation stages to produce speed change command signals only when the speed of the output shaft of the torque converter decreases to a value lower than a predetermined speed.

1. Upper Limit Speed Detection Circuits 10a and 10c

Figure 5A:
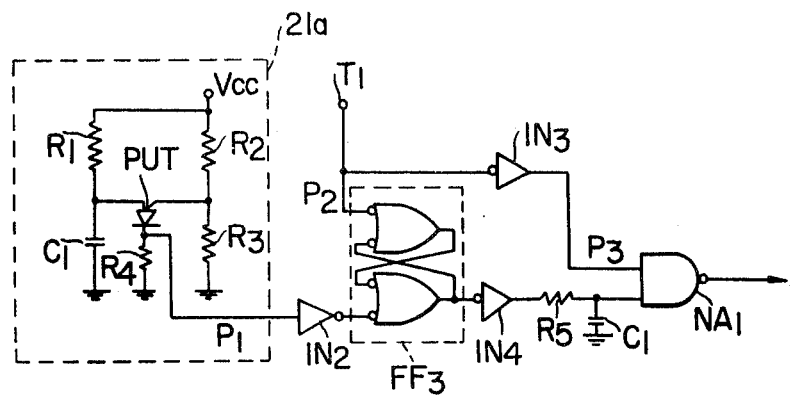
FIG. 5 is an electric circuit showing one example of a detection circuit for detecting the upper limit of the number of revolution.
Figure 5B:
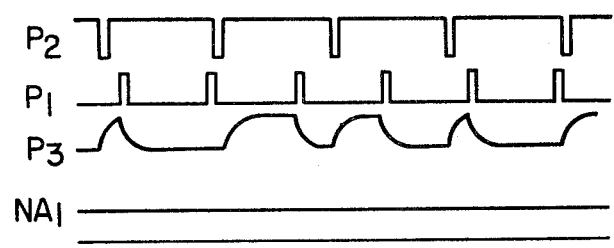

The purpose of the upper limit speed detection circuits 10a and 10c is to detect the fact that the speed of the torque converter output shaft has exceeded a predetermined speed, and one example thereof is shown in FIG. 5a. As shown, there is provided a relaxation oscillator 21a utilizing a programmable unijunction transistor $PUT_1$ and the frequency of the oscillation pulse $P_1$ of the relaxation oscillator is determined by the time constant of a resistor $R_1$ and capacitance $C_1$ and resistors $R_2$ and $R_3$. Thus, the values of various resistors and capacitor and selected so as to produce the oscillation pulse $P_1$ having a frequency corresponding to the predetermined number of revolutions. Assume now that the frequency of the torque converter output shaft speed detection signal applied to terminal $T_1$ has been decreased in accordance with the number of the projections of the disc 7 by the operation of a suitable frequency divider, not shown, so that the pulse period of the detected signal represents directly the period of one revolution of the torque converter output shaft, the period of the oscillation pulse $P_1$ is determined to be equal to the period of one revolution of the predetermined number of revolutions where the signal impressed upon the terminal $T_1$ is not passed through the frequency divider, the period of the oscillation pulse $P_1$ will be determined by the number of the projections of the disc 7. The oscillation pulse $P_1$ is passed through an inverter $IN_2$ to decrease its level and the output of inverter $IN_2$ is applied to the set input terminal of a flip-flop circuit $FF_3$. The detection signal applied to terminal $T_1$ is a low level pulse signal $P_2$ which is applied to the reset input of the flip-flop circuit $FF_3$ and to one input of a NAND gate circuit $NA_1$ via inverter $IN_3$. A resistor $R_5$ and a capacitor $C_2$ constitute a delay circuit so that the output from inverter $IN_4$ is delayed to form a delayed signal $P_3$ which is applied to the other input of the NAND gate circuit $NA_1$.

Where the speed of the torque converter output shaft is lower than the set or predetermined speed, the period of the pulse $P_2$ is longer than that of the oscillation pulse $P_1$ so that the delayed pulse $P_3$ does not coincide with pulse $P_2$ as shown by the timing chart shown in FIG. 5b. Under these conditions, the NAND gate circuit $NA_1$ does not produce any output.

Figure 5C:
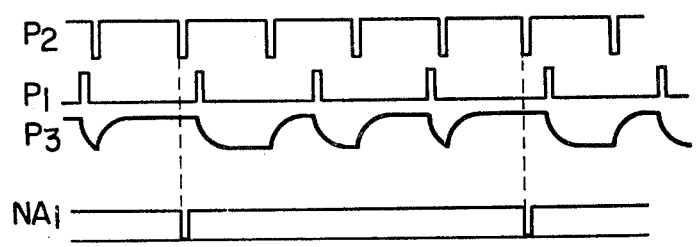

On the other hand, where the speed of the torque converter output shaft is higher than the set speed, the period of pulse $P_2$ is shorter than that of pulse $P_3$ as shown in FIG. 5c. Under these conditions, there is a chance for the pulse $P_3$ to coincide with pulse $P_2$, so that the NAND gate circuit $NA_1$ produces a low level output pulse.

In this embodiment, three such upper limit speed detection circuits are provided for each of the shift-up upper limit speed detection circuit 10a and the lock-up upper limit speed detection circuit 10c. Of course, the respective set speeds are set to values as shown in FIG. 3.

Where a variable resistor is used as the resistor $R_1$ of the relaxation oscillator 21a, it is possible to suitably vary the set speed. Accordingly, it is possible to vary as desired the speed changing point in accordance with the variations in the operating condition of the vehicle.

When the conditions of the logical products of the logical product circuits $A_{21}$ through $A_{23}$ and $A_{27}$ through $A_{29}$ are established in accordance with the output pulses of respective detection circuits and the throttle opening detection signal, a pulse shift-up signal $u$ or a torque converter lock-up signal L is generated through the logical sum circuits $OR_{11}$ and $OR_{13}$.

2. Lower Limit Speed Detecting Circuit 10b

The lower limit speed detection circuit 10b is provided for the purpose of detecting the fact that the torque converter output shaft speed has decreased to a value lower than the set or predetermined speed. FIG. 6a shows one example of this circuit. A relaxation oscillator 21b is provided comprising resistors $R_6$ through $R_{11}$, and a capacitor $C_3$. The period of the torque converter output shaft speed detection cignal $P_2$ applied to terminal $T_2$ is compared with the oscillation period.

Of course the period of the oscillation frequency has been set in a manner described above in accordance with the period of the set speed.

Figure 13:
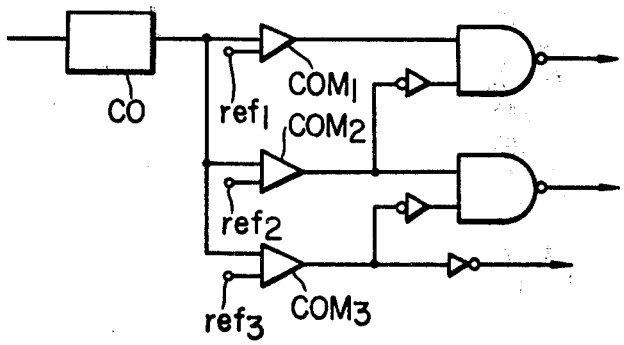
FIG. 13 shows a modification of the detection circuit for detecting the lower limit of the number of revolutions.

A case wherein the speed of the torque converter output shaft is higher than the set speed will now be described with reference to FIGS. 6a and 6b. The torque converter output shaft signal applied to inverter $IN_5$ from terminal $T_2$ is the pulse $P_2$ of a low level. As a result, upon application of the pulse $P_2$, transistor $Tr_1$ is renedered ON thus reducing the potential at point $q_1$ to zero. Upon disappearance of the pulse $P_2$, transistor $Tr_1$ is turned OFF thereby commencing to charge capacitor $C_3$. Since the period of the pulse $P_2$ is shorter than the oscillation period, the next pulse is applied before the potential at point $q_1$ decreases to a value below the standoff voltage VA, thus decreasing the potential point $q_1$. Accordingly, a programmable unijunction transistor $PUT_2$ will not be rendered ON, and a pulse $P_4$ will not be produced. The upper limit speed detection circuit and the lower limit speed detection circuit have processed as a pulse, but it is possible to detect the output speed of the torque converter with a pickup coil and the picked up signal is converted into a voltage signal by means of a frequency-voltage converter. Then, it is possible to detect the signal by an analogue comparison. Thus, as shown FIG. 13, the output from a frequency-voltage converter Co is applied to one inputs of comparators $COM_1$ through $COM_3$, and the reference voltages corresponding to respective numbers of revelutions are applied to ref-1, ref-2 and ref-3 according to their magnitudes and these voltages are then compared with each other by means of comparators to produce outputs.

Figure 6C:
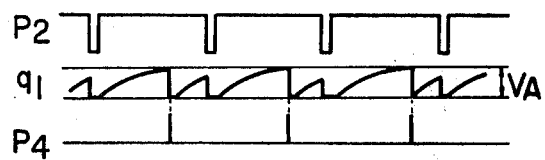

As the torque converter output shaft speed decreases below the set speed, the period of the pulse $P_2$ is lengthened so that the potential of point $q_1$ reaches the stand off voltage before transiter $Tr_1$ is turned ON. Accordingly, $PUT_2$ is rendered OFF thereby producing an output pulse $P_4$ as shown in FIG. 6c.

In this embodiment, three such lower limit speed detection circuits are provided for each shift-down lower limit speed detection circuit 10b. Of course, respective set speeds are different as shown in FIG. 3.

In the same manner as has been described above, if a variable resistor is substituted for resistors $R_6$, it would be possible to vary as desired the speed changing point.

When the conditions of the logical products of the logical product circuits $A_{24}$ through $A_{26}$ are established in accordance with the output pulses from respective detection circuits and the throttle opening detection signals, a pulsed shift-down signal D is produced.

3. Speed Change Stage Holding Circuit 11

Figure 7A:
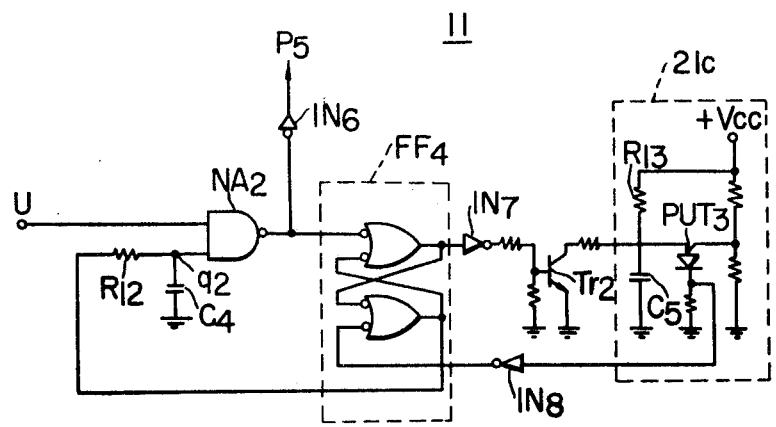
FIG. 7 is a connection diagram showing one example of a speed changing stage holding circuit.
Figure 7B:
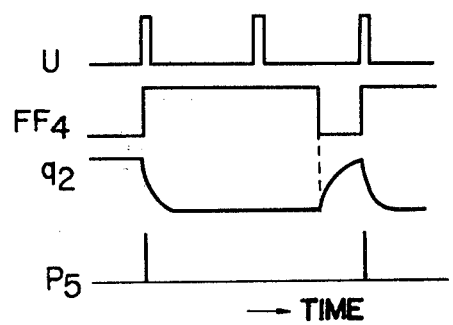

Although the speed change control is made in accordance with the shift-up signal U and the shift-down signal D, higher stability of the speed changing operation could be expected if the speed change signal were not produced continuously if one considers the operating time of the system of oil pressure devices. Accordingly, the speed change stage holding circuit 11 is provided for the purpose of holding the speed change state until the speed changing operation at that stage is completed. The circuit 11 is provided for the purpose of preventing the supply of the speed change command pulse (the shift control signal of register 14) for a predetermined interval. FIG. 7a shows one example of the holding circuit 11, in which the holding time is determined by the oscillation period of a relaxation oscillator 21c. The shift-up signal U or the shift-down signal D is impressed upon one input of a NAND gate circuit $NA_2$. Assume now that a shift-up signal U as shown in FIG. 7b is impressed, then the NAND gate circuit $NA_2$ is turned ON to set a flip-flop circuit $FF_4$. Then, as the reset side output of this flip-flop circuit $FF_4$ becomes a low level, the potential of a point $q_2$ which is the other input of the NAND gate circuit $NA_2$ will be decreased by the discharge of capacitor $C_4$, as shown in FIG. 7b. Consequently, a speed change command pulse $P_5$ shown in FIG. 7b is produced through an inverter $IN_6$, which is used as the shift control signal for the bidirectional shift register 14. The set side output of the flip-flop circuit $FF_4$ is rendered to have a low level by the action of an inverter $IN_7$, thereby turning OFF transistor $Tr_2$. Thus, the charging of capacitor $C_5$ through a resistor $R_{13}$ is commenced and as the stand-off voltage of a programmable unijunction transistor $PUT_3$ is reached, the $PUT_3$ is turned ON. Accordingly, the flip-flop circuit $FF_4$ is reset through an inverter $IN_8$ thus starting the charging of capacitor $C_4$ through resistor $R_{12}$. The NAND gate circuit $NA_2$ will not be turned ON until the potential at point $q_2$ reaches a threshold level so that even if the shift-up signal U were impressed upon the NAND gate circuit $NA_2$ during this interval, any speed change command pulse $P_5$ would not be produced, thus holding the speed change stage. (This corresponds to a monostable multivibrator having 100% duty). The same description of course applies to the shift-down signal D. More particularly, a speed change command signal due to the shift-down signal D is formed by a circuit similar to that shown in FIG. 7a for holding the speed change stage for a predetermined interval.

4. Lock-up Release Timer Circuit 15 at the Time of Speed Changing

Figure 8A:
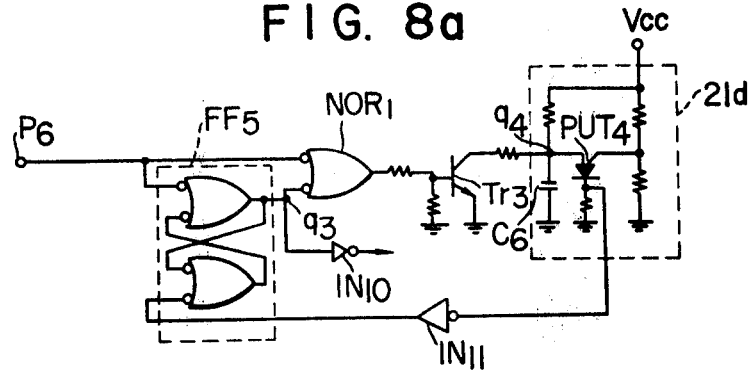
FIG. 8 is a connection diagram showing one example of a timer circuit utilized to release the lock-up at the time of speed changing.
Figure 8B:
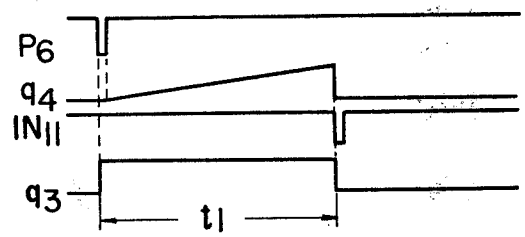

For the purpose of releasing the Lock-up of the torque converter for a definite time at the time of speed changing, a timer circuit as shown in FIG. 8a is provided. The release time is determined by the oscillation period of a relaxation oscillator circuit 21d comprising a programmable unijunction transistor $PUT_4$. As shown in FIG. 8b, upon application of a low level shift control signal $P_6$ (a speed change command pulse) upon the set input of a flip-flop circuit $FF_5$, this flip-flop circuit $FF_5$ is set to elevate the potential at point $q_3$ to a high level. Upon disappearance of the pulse $P_6$, the output of a NOR gate circuit $NOR_1$ becomes a low level thus turning OFF transistor $Tr_3$. Accordingly, the changing of capacitor $C_6$ is commenced, and as the potential of point $q_4$ reaches the stand-off point the programmable unijunction transistor $PUT_4$ is turned ON thereby resetting the flip-flop circuit $FF_5$ via an inverter $IN_{11}$; Then the potential of point $q_3$ becomes a low level. The time $t_1$ required for the potential of point $q_4$ to reach the stand-off point corresponds to the torque converter lock-up release time. The potential point $q_3$ is inverted by an inverter 10 and then impressed upon a logical product circuit $A_{30}$. As a result, during said interval, the logical product circuit $A_{30}$ is maintained in its OFF state, so that any torque converter lock-up signal is not sent to the valve drive circuit 18. In this manner the torque converter is coupled to the load during speed change. As the lock-up flip-flop circuit $FF_2$ is reset when the shift-down signal D is generated the pulse $P_6$ applied to the timer circuit 15 is not limited to the shift control signal generated by the logical circuit 23, but the shift-up signal U or a speed change command pulse for shift-up can also be used for the same purpose.

5. Bidirectional Shift Register 14

As described above, the bidirectional shift register 14 is used to form a speed change stage designating signal for effecting automatic speed change, and is composed of a two input NAND gate circuit and a J-K flip-flop circuit, for example a method of applying a data input, a clear signal, a shift control signal, and a mode control signal will be described in the following.

Clear Signal

Since the reverse first speed K and the forward first speed are operated manually, where the shift lever is positioned at either one of reverse R, neutral N and forward first speed, the detection signal from the range selection circuit 9 clears the register 14 via the logical sum circuit $OR_{10}$. Also the manual signal provided by the manual-automatic switching circuit 22 during manual operation clears the shift register 14.

Data Input

The data input to the bidirectional shift register 14 is formed by a present circuit 20 which is constructed to form a data input when the position of the shift lever is set to a speed exceeding the forward second speed during automatic operation. Where the operation is quickly switched to the automatic operation from the manual operation, a speed change stage designating signal is produced from an output stage of the bidirectional shift register 14 corresponding to the speed change stage which has been set so as to apply a data input to the flip-flop circuit in the shift register 14, which corresponds to said speed change stage.

Figure 9:
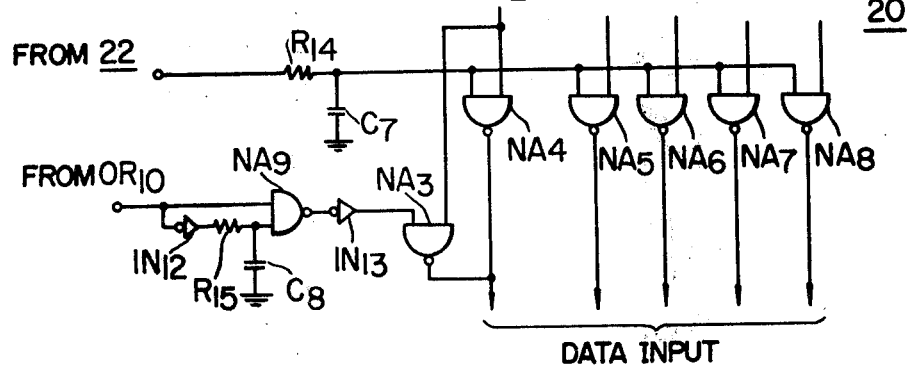
FIG. 9 is a connection diagram showing one example of a preset circuit for forming input data to a bidirectional shift register.

FIG. 9 shows a diagram showing one example of the preset circuit 2, in which shift lever position detection signals produced by the range select detection circuit 9 and respectively corresponding to the forward second speed to the forward sixth speed ($F_2$–$F_6$) are applied to NAND gate circuits $NA_3$ through $NA_6$, respectively. The level of the signal from the switching circuit 22 is set to be high at the time of manual operation, whereas to be low at the time of automatic operation, and the level of the clear signal from the logical sum circuit $OR_{10}$ is set to be low. During the automatic operation, if the shift lever is advanced from the forward first speed to the forward second or higher speed position, the level of the signal from the logical sum circuit $OR_{10}$ is changed from low to high. Until this time, a potential of high level has been impressed upon resistor $R_{15}$ and capacitor $C_8$ through inverter $IN_{12}$, the capacitor $C_8$ will begin to discharge. Consequently, the NAND gate circuit $NA_9$ produces a pulse output at an instant when the signal from the logical sum circuit changes to a high level. This pulse output is applied to the NAND gate circuit $NA_3$ via inverter $IN_{13}$. Also, the shift lever position detection signal corresponding to the forward second speed is applied to the NAND gate circuit $NA_3$. At an instant when the signal from the logical sum circuit $OR_{10}$ change to a high level, the shift lever is always positioned at the forward second speed position, so that the NAND gate circuit $NA_3$ is turned ON thereby producing a pulse output. Thus, a data input is applied to the flip-flop circuit of the bidirectional shift register 14 corresponding to the forward second speed change stage. This data is suitably shifted by said shift control signal, and said mode control signal thereby producing the desired speed change stage designation signal from the shift register 14. The output from NAND gate circuits $NA_3$ and $NA_4$ act as the data inputs for the flip-flop circuit of the shift register 14 corresponding to the forward second speed, the output from NAND gate circuit $NA_5$ acts as the data input for the flip-flop circuit corresponding to the forward third speed change stage and the NAND gate circuits $NA_6$, $NA_7$ and $NA_8$ correspond to the forward fourth speed through the forward sixth speed, respectively. A case wherein the operation is rapidly switched to automatic operation from manual operation will be described as follows.

Assume now that the manual operation is performed at the forward fifth speed position of the shift lever, the detection circuit 9 produces a detection signal of the forward fifth speed. Since a manual signal is being sent from the switching circuit 22, the condition of the logical product holds for the logical product circuit $A_4$, so that this circuit is turned ON. The output of the logical product circuit $A_4$ is applied to the valve drive circuit 18 via a logical sum circuit $OR_8$ to select the speed change stage for the forward fifth speed. At this time, the manual signal from the switching circuit is at the high level and the capacitor C is at the charged state. As a result, the NAND gate circuit $NA_7$ has been turned ON, but as has been pointed out, since the manual signal from the switching circuit 22 has cleared the shift register 14, no data input would be applied. Under these conditions, when the operation is switched to the automatic operation, the shift register 14 is cleared and the signal from the switching circuit is changed to the low level signal. However, as the potential is maintained by capacitor $C_7$, at the instant of switching, the data input from the NAND gate circuit $NA_7$ is sent out. This NAND gate circuit is turned OFF by the discharge of capacitor $C_7$. Thus, the data input is applied to the flip-flop circuit of the shift register 14 corresponding to the forward fifth speed with the result that the shift register 14 sends out the speed change designation signal for the forward fifth speed. Even when the manual operation is made at any speed change stage of from the forward second to the forward sixth speed, it is possible to rapidly switch to the automatic operation at the same speed change stage.

Shift Control Signal

As has been pointed out hereinabove, the speed change command pulse provided by the speed change stage holding circuit 11 is utilized as the shift control signal for the bidirectional shift register 14. However, since the illustrated embodiment is designed to have both functions of range selection and holding, the speed change command pulse from the holding circuit 11 is applied to the shift register 14 via the logical circuit 23. The range selection circuit 12 and the holding circuit 19 will be described later.

Mode Control Signal

Figure 4:
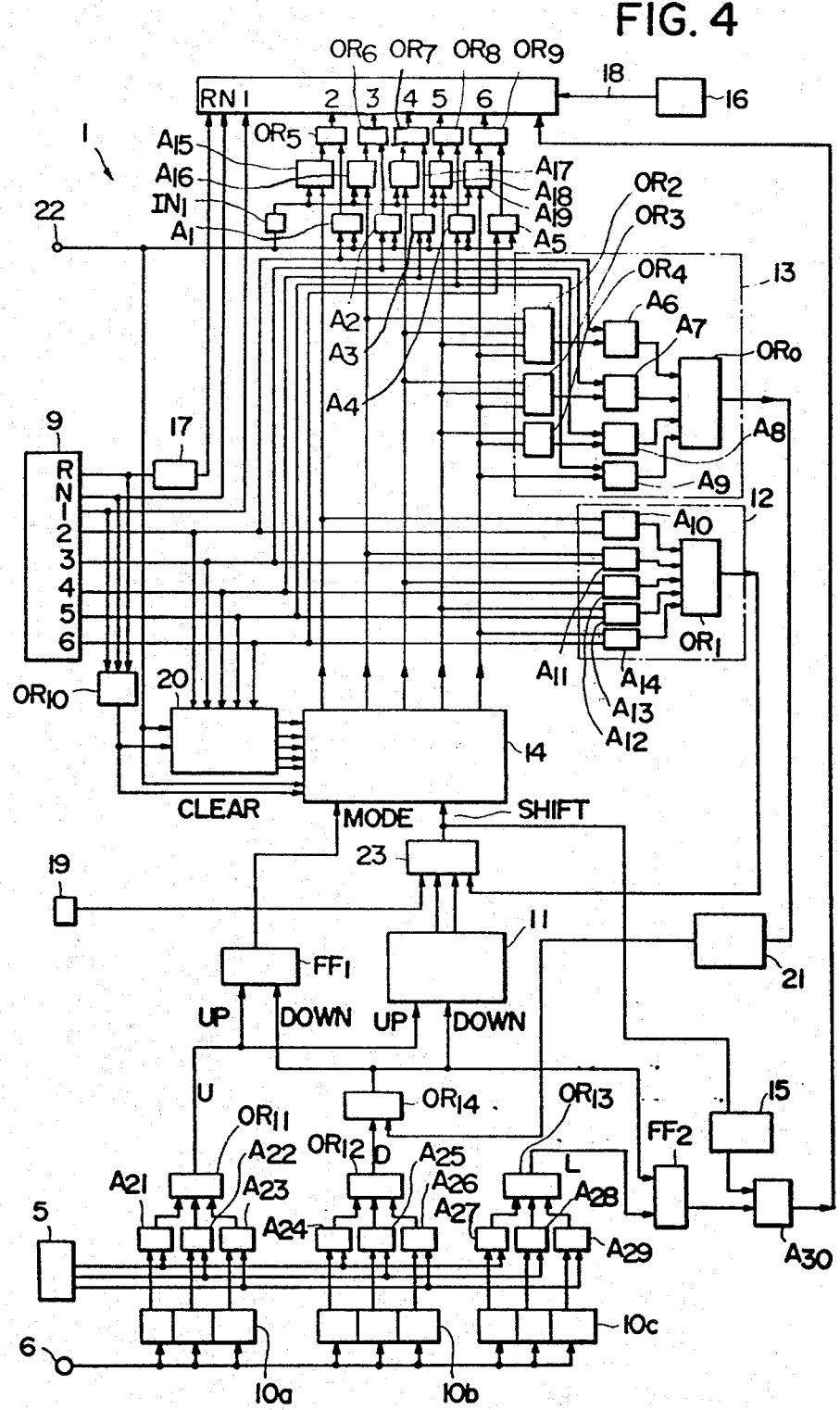
FIG. 4 is a block diagram showing the connection of one example of an electronic control apparatus used in the automatic speed changing apparatus embodying the invention.

The shift register 14 is shifted to right or left by the shift control signal and in response to such shift, the shift register supplies a speed change command signal from its predetermined output stage, the direction of shift being determined by the mode control signal. The circuit shown in FIG. 4 is constructed such that the shift-up signal U from the logical sum circuit $OR_{11}$ is applied to the set input of the mode control flip-flop circuit $FF_1$ and that the shift-down signal D from the logical sum circuit $OR_{14}$ is applied to the reset input of the flip-flop circuit. Consequently, when the shift-up signal U is received, the flip-flop circuit $FF_1$ is set to apply its set output to the shift register 14 to act as the mode control signal. The shift register 14 is constructed such that it is shifted-up (to the right) so that each time one shift control signal is applied the shift register 14 is shifted-up to change the gear to the high gear condition through the valve drive circuit 18. Upon reception of a shift-down signal D, the flip-flop circuit $FF_1$ is reset to apply its reset output to the shift register 14 to act as the mode control signal, at this time, the shift register 14 is shifted down (to the left) and each time a shift control signal is applied the shift register 14 is shifted down to change the gear to the low gear condition of course, as an automatic signal having a polarity opposite to that of the manual signal is sent from the switching circuit 22 the automatic signal is applied to the logical product circuits $A_{15}$ through $A_{19}$ via inverter $IN_1$. Thus, the condition for the logical product is established in response to the output from the shift register whereby the valve drive circuit 18 sends out a valve drive signal for a predetermined speed change stage.

As described above, the bidirectional shift register 14 operates to form the speed change stage designation signal for the automatic speed change. It should be understood, however, that means for forming the speed change stage designation signals is not limited to this arrangement and that any other suitable arrangement such as a reversible counter or the like can also be utilized. In such an alternative arrangement too, an independent speed change stage holding circuit is provided for each one of the shift-up signal U and the shift-down signal D for the purpose of separately forming the speed change command pulses for shift-up and shift-down. These two speed change command pulses are used as the up-input and the down-input, respectively, for the reversible counter. However, it is necessary to use a decoder for the purpose of converting the count output of the reversible counter into a decimal signal.

6. Range Select Circuit 12

If the shift control signal were applied unlimitedly, the output from the shift register 14 would overflow. Further, in some cases it is necessary to limit the maximum speed change stage by taking into consideration load conditions or the like. In view of these facts, a range select circuit 12 is provided having a purpose of utilizing a set speed change stage of the shift lever as the maximum automatic speed change stage so as to effect the automatic speed change within the speed change stage which have been set. The range select circuit 12 comprises a group of logical circuits connected to receive the shift lever position detection signal from the range select detection circuit 9 and the speed change stage designation signal from the shift register 14.

Under an assumption that the shift lever is set to the forward fourth speed position the operation of the circuit shown in FIG. 4 will be described hereunder. The lever position detection signal from the range select detection circuit 9 is applied to one input of the logical product circuit $A_{12}$. Assume now that a speed change stage designation signal for the forward second speed is sent from the shift register 14 at this time, then this signal is applied to the logical product circuit $A_{10}$. Accordingly, the conditions for the logical product are not established for both logical product circuits $A_{10}$ and $A_{12}$. Then, when a shift-up signal is applied, the shift register 14 produces a speed change stage designation signal which is applied to the logical product circuit $A_{11}$. However, the conditions for the logical products are not established for both logical product circuits. When the shift register 14 produces a speed change stage designation signal for the forward fourth speed in response to another shift-up signal U, the speed change stage designation signal is applied to the other input of the logical product circuit $A_{12}$. As a result, the condition for the logical product circuit $A_{12}$ is established and the output from this circuit is impressed upon the logical circuit 23 via the logical sum circuit $OR_1$. It is assumed now that under the established condition, the output from the logical sum circuit $OR_1$ is at a low level, whereas when the condition is not established, output from the logical sum circuit $OR_1$ is at the high level. As a result, until the forward third speed is reached, the signal applied to the logical circuit 23 from the logical sum circuit $OR_1$ is at the high level. Accordingly, the condition for the logical circuit 23 is established in response to the speed change command pulse for shift-up operation from the speed change stage holding circuit 11 thus forming a shift control signal. When the forward fourth speed is reached the output signal from the logical sum circuit $OR_1$ becomes a low level signal so that even when the speed change command signal for shift-up is applied, the condition for the logical circuit will not be established. Consequently, no shift control signal is formed with the result that the speed will not be changed to a stage higher than the forward fourth speed set by the shift lever.

Figure 10:
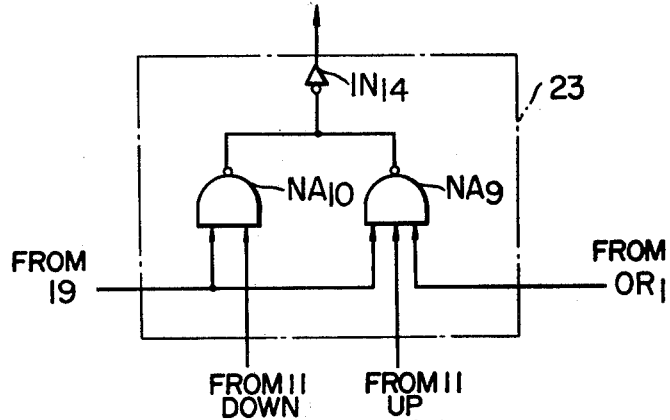
FIG. 10 is a connection diagram showing one example of the logic circuit for forming a shift control signal for the bidirectional shift register.

The logical circuit 23 is constructed as shown in FIG. 10, for example. More particularly, the output from the logical sum circuit $OR_1$ is applied to the NAND gate circuit $NA_9$, and the speed change command pulse applied to the NAND gate circuit $NA_9$ has been formed in accordance with a shift-up signal U. A speed change command signal formed in response to the shift-down signal D is applied to the NAND gate circuit $NA_{10}$ whereas the output from the logical sum circuit $OR_1$ is not applied to this NAND gate circuit. For this reason, for effecting a shift-down operation, a shift control signal is generated without being influenced by the output from the range select circuit 12. Of course, at this time, the mode control signal commands a shift-down operation. The outputs from the NAND gate circuits $NA_9$ and $NA_{10}$ are impressed upon the shift register 14 via a wired-OR connected inverter $IN_{14}$ to act as a shift control signal.

A signal from a hold circuit 19 is also applied to the logical circuit 23 which is of the type in which a predetermined speed change stage is maintained during running. Suppose now that the vehicle is running at the forward fourth speed and that the hold switch (not shown) of the hold circuit 9 has just closed. Before closure of the switch, since the hold circuit produces a high level signal, the NAND conditions for the NAND gate circuits $NA_9$ and $NA_{10}$ will be established in accordance with the other conditions (the output from the speed change stage hold circuit 11, and the output from the range select circuit 12). Upon closure of the switch the output from the hold circuit 19 becomes a low level so that the condition for NAND gate circuits $NA_9$ and $NA_{10}$ are not established. As a consequence, no shift control signal is generated whereby the predetermined speed change stages (forward fourth speed) is maintained.

7. Forced Shift-Down Circuit 13

Where it is necessary to rapidly reduce the vehicle speed, as for example it runs down a slope, a forced shift-down circuit 13 operates. The purpose of this circuit is to rapidly shift-down to a predetermined speed change stage if the shift lever has been set to a lower speed change stage than the automatic speed change stage during running. The shift lever detection signals generated by the range select detect circuit 9 and corresponding to from the forward second to fifth speeds but excluding the maximum speed change stage (that is the forward sixth speed) are applied to one inputs of the logical product circuits $A_6$ through $A_9$, respectively. The other inputs of these logical product circuits are connected to receive from the shift register 14 the speed change stage designation signals corresponding to the shift lever positions higher than said position via logical sum circuits $OR_2$, $OR_3$ and $OR_4$, respectively. For example, the shift lever position detection signal corresponding to the forward second speed is coupled to one input of the logical product circuit $A_6$, whereas the speed change stage designation signals corresponding to form the forward third to the forward sixth speed are coupled to the other input through the logical sum circuit $OR_2$.

Suppose now that the vehicle is running at the forward sixth speed and that the shift lever is set to the position corresponding to the forward fourth speed. Then, the speed change stage designation signals from the shift register 14 are applied to the logical product circuits $A_6$, $A_7$ and $A_8$ respectively through the logical sum circuits $OR_2$, $OR_3$ and $OR_4$. These designation signals are also applied to the logical product circuit $A_9$. Since the detection signal from the range select detection circuit 9 is applied to the logical product circuit $A_8$, the condition thereof is established, thus producing a forced shift-down signal via the logical sum circuit $OR_{10}$. This output signal is applied to an oscillation circuit 21 to generate a forced shift-down pulse. Any oscillator that can produce an output pulse in response to the forced shift-down signal from the logical sum circuit $OR_5$ may be used as the oscillator circuit 21. Among these alternative oscillators are included a combination of a relaxation oscillator utilizing a programmable unijunction transistor and a logical product circuit, and a combination of a relaxation oscillator and a transistor. Since these combinations are old it is believed unnecessary to describe them herein in detail.

The forced shift-down pulse from the oscillation circuit 21 is applied to the mode control flip-flop circuit $FF_1$ and the speed change stage holding circuit 11 via a logic sum circuit $OR_{14}$. Thereafter, the shift down is performed in a manner described above. Thus, the shift register 14 is shifted down to send out a speed change stage designation signal for the forward fifth speed. This signal is applied to the logical product circuits $A_6$, $A_7$ and $A_8$ respectively through logical sum circuits $OR_2$, $OR_3$ and $OR_4$, thereby establishing the condition for the logical product circuit $A_8$. Thus, forced shift down operation is again performed. In this manner, the shift register 14 is shifted down to produce a speed change stage designation signal for the forward fourth speed. This signal is applied to one inputs of the logical product circuits $A_6$ and $A_7$, but as the detection signal from the range select detection circuit 9 is applied to the logical product circuit $A_8$, the condition thereof is not established with the result that no forced shift down signal is generated. Thus, the shift-down is caused out from an upper speed change stage to a lower speed change stage set by the shift lever. Upon completion of the forced shift-down, and when a shift-up signal, for example, is produced, the mode control signal indicates the shift-up. However, as the shift lever is still positioned at the forward fourth speed position, the range select circuit 12 operates to inhibit the shift-up operation.

Although in the connection shown in FIG. 4, the forced shift-down pulse from the oscillation circuit 21 is also coupled to the set input of the lock-up flip-flop circuit $FF_2$, it is to understood that it is also possible to couple only the output from the logical sum circuit $OR_{12}$ to the reset input of the flip-flop circuit $FF_2$. Furthermore, where the period of the oscillation circuit is equal to or longer that than of the speed change stage holding circuit 11 it is not always necessary to apply the forced shift-down pulse to the speed change stage holding circuit 11.

In such a case, the forced shift-down pulse may be applied directly to the shift register 14 to act as a shift control signal. Also it is necessary to prevent the shift-up signal U from being applied to the flip-flop circuit $FF_1$ and the speed change stage holding circuit 11 while the forced shift-down signal is being generated. To this end, the output from the logical sum circuit $OR_{10}$ is inverted by an inverter, not shown, and the inverted signal is applied to the other input of a logical product circuit (not shown) with one input connected to the output of a logical sum circuit $OR_{11}$, the output thereof being applied to the flip-flop circuit $FF_1$ and the speed change stage holding circuit 11 to act as the shift-up signal U. Accordingly, when the forced shift-down circuit 13 produces a forced shift-down signal the condition for said logical product circuit is not established and hence no shift-up signal U is generated. To attain the forced shift-down operation, the shift lever should instantly reach the designated stage. For this reason, the shift-down pulse is sent directly to the shift register 14 without passing through the speed change stage holding circuit.

8. Neutral Inhibit Circuit 16

Figure 11A:
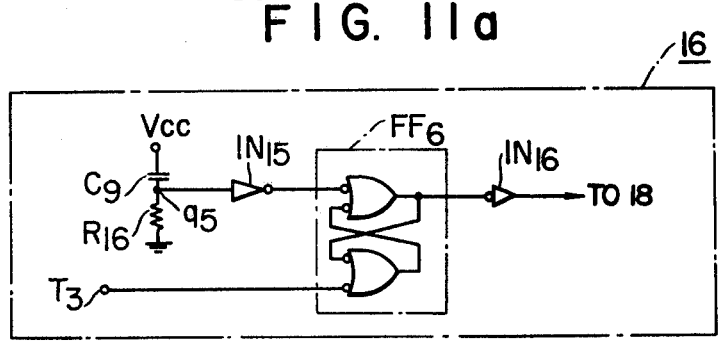
FIG. 11 is a connection diagram showing one example of a neutral inhibit circuit.
Figure 11B:
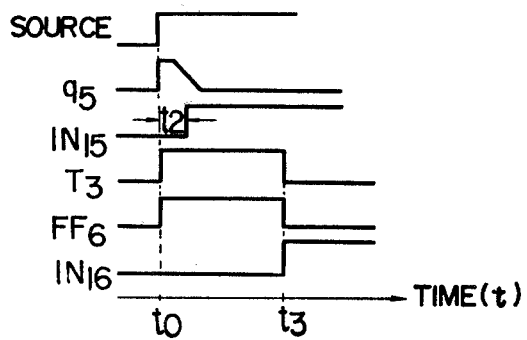

When the source switch, not shown, is closed while the shift lever is positioned at a speed change stage other than the neutral, the valve associated with that stage would be operated. To prevent this the neutral inhibit circuit 16 is provided. FIG. 11a illustrates one example of the neutral inhibit circuit 16 in which a neutral detection signal is applied to its terminal $T_3$ from the range select detection circuit 9. As shown in FIG. 11b, at an instant $t_0$ a source switch is closed to apply the source voltage $V_{ac}$. Then the potential of point $q_5$ is varied as shown through the action of a capacitor $C_9$ and a resistor $R_{16}$. A low level signal is applied to a flip-flop circuit $FF_6$ via an inverter $IN_{15}$ for an interval $t_2$ thus changing the output of the flip-flop circuit $FF_6$ to a high level. This high level signal is converted into a low level signal by the action of an inverter $I_{16}$ and the low level signal is applied to valve drive circuit 18 which is constructed to be inoperative when the output signal from the inverter $IN_{16}$ is at a low level (the gate is disenabled). Consequently, no valve drive signal is sent out and the vehicle does not run. At an instant $t_3$, the shift lever is set to the neutral, and when a low level neutial detection signal is applied to the flip-flop circuit after instant $t_3$, the flip-flop circuit $FF_6$ is reset thereby producing a low level output. Consequently, the inverter $IN_{16}$ produces a high level signal whereby the valve drive circuit 18 is energized (gate is enabled). This energized condition is maintained by the Flip-flop circuit $FF_6$.

As described above, the vehicle can run only when the shift lever is set to the neutral position after closure of the source switch.

9. F-R Inhibit Circuit 17

Figure 12A:
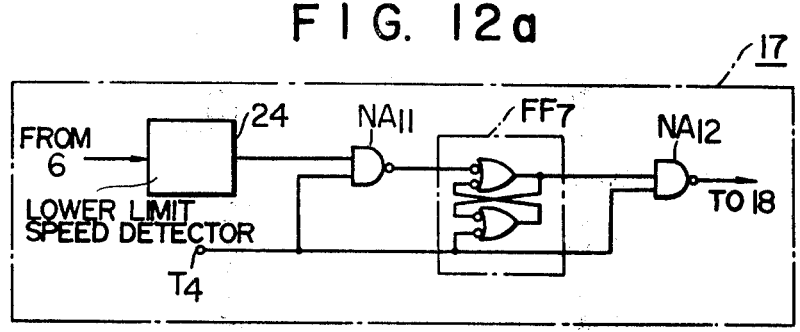
FIG. 12 is a connection diagram showing one example of an F-R inhibit circuit.
Figure 12B:
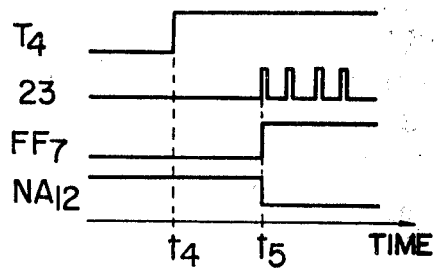

The purpose of the F-R inhibit circuit 17 is to permit to use the reverse speed change stages only after the speed of the torque converter output shaft has reduced to a value lower than a predetermined number of revolutions. One example of this circuit is shown in FIG. 12a including a lower limit speed detection circuit 24, as shown in FIG. 6, which operates to compare the detected speed produced by the torque converter output shaft speed detector 6 with a predetermined reference or set speed thereby producing an output pulse when the detected speed is lower than the reference speed. A reference speed of about 400 r.p.m. is suitable for the reverse speed change stage. The output from the lower limit speed detector 24 is applied to one input of a NAND gate circuit $NA_{11}$, the other input thereof being connected to terminal $T_4$ for receiving a lever position detection signal for the reverse speed change stage from the range select detection circuit 9. As shown in FIG. 12b, the shift lever is set to the reverse stage at an instant $t_4$ so that the F-R inhibit circuit 17 does not produce any output even when a reverse speed change changing detection signal having a high level is applied to circuit 17, so that no valve drive signal for the reverse step is formed. When a reference speed detection pulse is produced by the lower limit speed detector 24 at an instant $t_5$, the NAND gate circuit $NA_{11}$ is turned ON thereby setting flio-flop circuit $FF_7$.

As a result, the condition for a NAND gate circuit $NA_{12}$ is established to send a valve drive signal for the reverse speed change stage from the driving circuit 18. Thus, as the vehicle runs in the reverse direction with a low speed, safety is assured.

VII. Operation

The operation of the control device thus far described will now be described by taking speed change range shown in FIG. 3 as an example.

When the source switch is closed, and when the shift lever is at the neutral position the neutral inhibit is released and the gate in the valve drive circuit 18 is enabled. As the shift lever is advanced from the forward first speed to the forward second speed position, a data input is applied to the shift register 14 from the present circuit 20. Accordingly, a speed change stage designation signal for the forward second speed is applied to the logical product circuit $A_{15}$, thus turning ON the same. Consequently, a signal is applied to the valve drive circuit 18 via the logical sum circuit $OR_5$ for sending out a valve drive signal for the forward second speed.

Assume now that the opening of the throttle valve is about 1/2, and the number of revolutions of the torque converter is equal to $S_5$, the upper limit speed detection circuit $10_c$ supplies an output pulse to one input of the logical product circuit $A_{27}$. Since the detection signal from the throttle opening detector 5 is applied to the other input of the logical product circuit $A_{27}$, the condition for this circuit is established so that it provides a lock-up signal via the logical sum circuit $OR_{13}$. In response to this output, the lock-up flip-flop circuit $FF_2$ is set to establish the condition for the logical product circuit $A_{30}$, whereby the drive circuit 18 produces a valve drive signal for locking-up the torque converter. In this manner, the torque converter is locked-up.

Then as the throttle opening is increased to 2/2 and the speed of the torque converter output shaft reaches $S_7$, a reference speed (or set speed) detection pulse is applied to one input of the logical product circuit $A_{22}$ from the upper limit speed detector $10a$. Since the detection signal from the throttle opening detector 5 is applied to the other input of the logical product circuit $A_{22}$, the conditions thereof is established, so that circuit $A_{22}$ sends a shift-up signal through the logical sum circuit $OR_{11}$. As a result, the shift register 14 is shifted up for applying the speed change stage designation signal for the forward third speed to the logical product circuit $A_{16}$. This signal is applied to the valve drive circuit 18 through the logical sum circuit $OR_{12}$ thus sending out a valve drive signal for the forward third speed. In this manner, the speed is varied from the lower speed change stage to the higher speed change stage. At this time, of course the lock-up of the torque converter is released.

When the depression of the acceleration pedal is decreased, and the throttle opening decreases below 1/2 when the speed of the torque converter ouput shaft is above $S_5$, a shift-up signal is formed in the same manner as above described whereby the shift register 14 is shifted-up to send a speed change stage designation signal for the forward fourth speed. At this time when the shift lever is positioned at the forward fourth speed position, the range selection circuit 12 operates.

As the vehicle speed is gradually decreased until the speed of the torque converter output shaft decreases below $S_2$ the lower limit speed detection circuit $10b$ applies a reference speed detection pulse to one input of the logical product circuit $A_{25}$. At this time, when the throttle opening is adjusted between 1/2 and 2/2 a throttle opening detection signal is applied to the other input of the logical product circuit $A_{25}$, whereby the condition thereof is established.

Accordingly, a shift-down signal is generated to release the lock-up of the torque converter. Concurrently therewith, the shift register 14 is shifted down to send a speed change stage designation signal for the forward third speed. Thus, the speed is changed from the upper speed change stage to the lower speed change stage.

In the foregoing description, the polarities of the signals of various circuits were not specified. Accordingly, when combining together circuits it is necessary to align the polarities of various signals.

Since the control apparatus of this invention is constructed as described above, it is possible to change the speed most adequately commensulate with the condition of an internal combustion engine while advantageously utilizing the characteristic of the torque converter. Moreover, as the parameters to be detected are only two, the is, the throttle opening and the speed of the output shaft of the torque converter, it is possible to simplify not only the construction of the control apparatus but also the assembling of the detecting elements. Accordingly, it is possible to apply the control apparatus of this invention to all types of vehicles. Where a variable resistor is used in the reference speed detection circuit, it is possible to readily vary the speed changing point thus making it suitable for easy application to vehicles of various types or operating at various conditions. As various signals including the detection signals are operated by logical circuits it is possible to form stable speed changing signals. Moreover as all signals as processed in the form of pulses, the control apparatus operates accurately and can determine the speed changing point and the speed changing time at extremely high accuracies. Further, as there are provided various safety device, the control apparatus of this invention is safe and durable. Although the invention has been shown and described in terms of a particular embodiments thereof it should be understood that many changes and alterations are obvious to one skilled in the art within the true spirit and scope of the invention as defined in the appended claims.

What is claimed is:

1. In an electronic control apparatus of an automatic speed changing apparatus for use in an internal combustion engine of the type wherein said engine is connected with a load through a fluid type torque converter and a multiple stage gear changer, the improvement with comprises means for locking-up said torque converter when the speed of the output shaft of said torque converter exceeds a first predetermined speed, means for shifting up said gear changer to a higher stage when the spaced of said outut shaft of said torque converter exceeds a second predetermined speed which is higher than said first predetermined speed, and means for shifting down said gear changer to a lower stage when the speed of said output shaft of said torque converter decreases below a third predetermined speed which is lower than said first predetermined speed.

2. The electronic control apparatus according to claim 1 which comprises means for generating a running signal including an electric signal corresponding to the load condition of said engine, and an electric signal corresponding to the speed of the output shaft of said torque converter; lock control signal generating means responsive to said running signal for generating a lock-up signal for locking-up said torque converter and a signal for releasing said lock-up; speed change signal generating means responsive to said running signal for generating a shift-up pulse for changing said gear changer to a higher stage and a shift-down pulse for changing said gear changer to a lower stage; speed change stage holding means responsive to said shift-up and shift-down pulses for generating a speed change command signal; speed change stage designation signal generating means responsive to the output from said speed change signal generating means and said speed change stage holding means for generating a first speed change stage designation signal which shifts up said gear changer to a higher stage when said speed change command signal is generated in response to said shift-up pulse and for generating a second speed change stage designation signal which shifts down said gear changer to a lower stage when said speed change command signal is generated in response to said shift-down pulse; valve drive signal generating means responsive to said speed change stage designation signals for generating an electric signal which actuates an oil pressure system of a predetermined speed change stage, means responsive to said lock control signal for generating an electric signal for operating an oil pressure actuated lock-up device for said torque converter, whereby when the speed of the output shaft of said torque converter exceeds a first predetermined speed at a predetermined throttle opening a first electric signal for locking up said torque converter is generated, said shift-up pulse is generated when said speed of the output shaft exceeds a second predetermined speed which is higher than said first predetermined speed, and said shift-down pulse and a second electric signal are generated when the speed of said output shaft falls below a third predetermined speed which is lower than said first predetermined speed.

3. The electronic control apparatus according to claim 2 wherein said speed change stage holding means does not generate a next speed change command signal for a predetermined interval after generation of a first speed change command signal.

4. The electronic control apparatus according to claim 2 which further comprises means for generating set speed change stage detection signals corresponding to the set position of a shift lever of the gear changer and a plurality of AND gate circuits receiving as their inputs said set speed change stage detection signals and speed change stage designation signals corresponding thereto and producing an output only when both of said signals are present at their inputs, whereby a speed change exceeding said set speed change stage of the shift lever is prevented by the output of said AND gate circuits.

5. The electronic control apparatus according to claim 2 which further comprises means for generating set speed change stage detection signals corresponding to the set position of a shift lever of the gear changer and a plurality of logical circuits receiving as their inputs said set change speed stage detection signals and speed change stage designation signals designating speed change stages higher than the set speed change stages and producing an output only when said detection signal and a speed change stage designation signal designating any of said change stages higher than said set speed change stage are present at their inputs, whereby the gear changer is forced to shift down progressively to said set speed change stage when the present speed change is higher than said set speed change stage of the shift lever.

6. The electronic control apparatus according to the claim 2 which further comprises a pulse generation circuit for producing a pulse upon closure of a switch of an electric source of the respective electric circuits, a detection circuit for detecting setting of the shift lever in a neutral position, a bistable circuit which is set by a pulse from said pulse generation circuit and reset by a signal from said detection circuit and means for preventing actuation of said valve drive signal generation means.

7. The electronic control apparatus according to claim 2 which further comprises a circuit for detecting setting of the shift lever in a reverse change speed stage, a lower limit revolution number detection circuit for generating a pulse when the revolution number of the output shaft of said torque converter falls below a predetermined revolution number and a control circuit which produces an electric signal for operating an oil pressure actuated device for the reverse speed change stage only when the outputs of both of said circuits are applied to said control circuit.

8. The electronic control apparatus according to claim 2 which further comprises a switch and an inhibition circuit which, upon closure of said switch, inhibits application of said shift-up and shift down pulses to said speed change stage designation signal generation means.

* * * * *